(12) United States Patent
May et al.

(10) Patent No.: US 8,323,030 B2
(45) Date of Patent: Dec. 4, 2012

(54) HEART COMPRESSION SIMULATION DEVICE

(76) Inventors: Daniel C. May, Oro Valley, AZ (US); Larry Bramlett, Marana, AZ (US)

( * ) Notice: Subject to any disclaimer, the term of this patent is extended or adjusted under 35 U.S.C. 154(b) by 421 days.

(21) Appl. No.: 12/753,539

(22) Filed: Apr. 2, 2010

(65) Prior Publication Data

US 2011/0104650 A1    May 5, 2011

Related U.S. Application Data

(60) Provisional application No. 61/166,656, filed on Apr. 3, 2009.

(51) Int. Cl.
*G09B 23/28* (2006.01)
(52) U.S. Cl. .......................................... 434/267
(58) Field of Classification Search .................. 434/262, 434/265, 267, 268, 272, 275, 276
See application file for complete search history.

(56) References Cited

U.S. PATENT DOCUMENTS

| | | | |
|---|---|---|---|
| 4,454,391 A | 6/1984 | Kim | |
| 4,984,987 A | 1/1991 | Brault et al. | |
| 5,195,896 A | 3/1993 | Sweeney et al. | |
| 5,249,968 A | 10/1993 | Brault et al. | |
| 5,286,206 A | 2/1994 | Epstein et al. | |
| 5,312,259 A | 5/1994 | Flynn | |
| 5,383,786 A | 1/1995 | Køhnke | |
| 5,417,143 A | 5/1995 | Pasek | |
| 5,423,685 A | 6/1995 | Adamson et al. | |
| 5,468,151 A | 11/1995 | Egelandsdal et al. | |
| 5,540,592 A | 7/1996 | Scheinberg et al. | |
| 5,580,255 A | 12/1996 | Flynn | |
| 5,628,633 A | 5/1997 | Lehman | |
| 5,885,084 A | 3/1999 | Pastrick et al. | |
| 6,007,342 A * | 12/1999 | Tjolsen | 434/265 |
| 6,227,864 B1 | 5/2001 | Egelandsdal et al. | |
| 6,500,009 B1 | 12/2002 | Brault et al. | |
| 6,530,783 B1 | 3/2003 | McGinnis | |
| 6,736,643 B2 | 5/2004 | Pastrick et al. | |
| 7,316,568 B2 * | 1/2008 | Gordon et al. | 434/262 |
| 7,857,625 B2 * | 12/2010 | Gomo | 434/267 |
| 8,241,042 B2 * | 8/2012 | Rosenthal et al. | 434/268 |

(Continued)

FOREIGN PATENT DOCUMENTS

WO    01/80284 A2    10/2001
(Continued)

OTHER PUBLICATIONS

WWW.CPR-SUPPLIES.COM; Little Anne™ Manikin; internet; as of Jan. 18, 2011.

(Continued)

*Primary Examiner* — Kurt Fernstrom

(57) ABSTRACT

A heart compression simulation device featuring a base with a compression spring; an actuator atop the compression spring that can move between an extended and fully compressed position; two pedestals atop the base opposite each other; actuator prongs on the actuator facing each pedestal; a hub attached to each pedestal that can pivot between a disengaged position and engaged position; leaf springs disposed on each hub adapted to engage the actuator prongs when the hubs are in the disengaged position and the actuator is moved to the fully compressed position, which causes a cracking sound to be produced; and a lock-out mechanism for securing the hubs in the engaged position keeping the leaf springs out of range of the actuator prongs, the lock-out mechanism is activated when the actuator is moved to the fully compressed position.

9 Claims, 17 Drawing Sheets

U.S. PATENT DOCUMENTS

| | | |
|---|---|---|
| 2001/0012609 A1 | 8/2001 | Pastrick et al. |
| 2005/0058977 A1 | 3/2005 | Cantrell et al. |
| 2006/0019229 A1 | 1/2006 | Morallee et al. |
| 2007/0054254 A1 | 3/2007 | Cook et al. |
| 2007/0264621 A1 | 11/2007 | Nysaether et al. |
| 2009/0293977 A1 | 12/2009 | Lauterbach |
| 2010/0021876 A1 | 1/2010 | Clash |

FOREIGN PATENT DOCUMENTS

| | | |
|---|---|---|
| WO | 02/03905 A2 | 1/2002 |
| WO | 2005-094176 A2 | 10/2005 |
| WO | 2007/093944 A2 | 8/2007 |
| WO | 2010131143 A1 | 11/2010 |

OTHER PUBLICATIONS

WWW.CPR-SUPPLIES.COM; CParlene® CPR Manikins; internet; as of Jan. 18, 2011.

WWW.CPR-SUPPLIES.COM; Prestan CPR Training Manikins; internet; as of Jan. 18, 2011.

WWW.CPR-SUPPLIES.COM; Ambu CPR Manikins and CPR Training Manikins; internet; as of Jan. 18, 2011.

WWW.CPR-SUPPLIES.COM; CPR Prompt Manikins, CPR Supplies; internet; as of Jan. 18, 2011.

WWW.CPR-SUPPLIES.COM; Basic Buddy™ Single CPR Manikin; internet; as of Jan. 18, 2011.

WWW.CPR-SUPPLIES.COM; Adult Sani-Manikin; internet; as of Jan. 18, 2011.

WWW.ARMSTRONGMEDICAL.COM; Actar D-fib® CPR/AED Manikin; internet; as of Jan. 18, 2011.

WWW.ARMSTRONGMEDICAL.COM; CPR / Adult—Manikins—CPR and Training—Armstrong Medical; internet; as of Jan. 18, 2011.

\* cited by examiner

UP (POSITION 1)
AT REST (SHEARING IN PROGRESS) (POSITION 2a)
3 CONSECUTIVE SNAP RESPONSES
(POSITIONS 2a–2c)

FULL DOWN (POSITION 4)
HUBS LOCKED HOLDING LEAF SPRINGS UP

UP (POSITION 5)
MECHANISM SET FOR SUBSEQUENT
'HEART MASSAGE PUMPING' MOTIONS

HEART COMPRESSION SIMULATION DEVICE

CROSS REFERENCE

This application claims priority to U.S. provisional application Ser. No. 61/166,656 filed Apr. 3, 2009, the specification of which is incorporated herein by reference in its entirety.

FIELD OF THE INVENTION

The present invention is directed to training mannequins for practicing cardio-cerebral resuscitation of a child or adult. The present invention is not limited to use for training purposes.

BACKGROUND OF THE INVENTION

Individuals involved in a cardiopulmonary resuscitation (CPR) course are taught how to perform basic chest compressions. However, during a real resuscitation experience one may need to perform compressions such that the costal cartilages in the ribs separate to allow for appropriate massage of the heart to circulate the oxygenated blood. For example, the American Heart Association (AHA) guidelines recommend compression depths of 1.5 to 2 inches, and compressions at this depth may cause the costal cartilages to separate. The present invention features a heart compression simulation device, which simulates the sensation of shearing/tearing the costal cartilages in the ribs during chest compressions (along with the possibility of breaking ribs in the elderly). The device may be used for the Hands-Only™ method of cardiopulmonary resuscitation of the AHA. The device can help teach proper chest compressions (which can help save lives), and can also help lessen an individual's fear of such an experience. The device (when used in a mannequin) can also provide accurate heart compression resistance. The device can calculate compressions with a compression counter, which can be used for evaluation of an individual's compression rate and depth.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a heart compression simulation device. In some embodiments, the device comprises a base; a compression spring extending upwardly from the base; an actuator disposed atop the compression spring, the actuator and base together sandwich the compression spring, wherein the actuator can move between an extended position wherein the actuator is positioned at a starting position above the base and a fully compressed position wherein the actuator is pushed down to the base, the actuator is biased in the extended position caused by the compression spring; a first pedestal and a second pedestal each disposed atop the base, the pedestals are positioned opposite each other and outside of the actuator; a set of first actuator prongs disposed on the actuator facing the first pedestal and a set of second actuator prongs disposed on the actuator facing the second pedestal; a first hub pivotally attached to the first pedestal and a second hub pivotally attached to the second pedestal; a first leaf spring disposed on the first hub and positioned below the set of first actuator prongs, and a second leaf spring disposed on a second hub and positioned below the set of second actuator prongs, the leaf springs are adapted to engage the respective sets of actuator prongs when the actuator is moved to the fully compressed position, the leaf springs provide resistance when the actuator is moved to the fully compressed position, wherein when the actuator is moved to the fully compressed position and the leaf springs engage the respective sets of actuator prongs a cracking sound is produced, wherein the hubs can each pivot between a disengaged position wherein the hubs are positioned to allow the leaf springs to engage the respective sets of actuator prongs and an engaged position wherein the hubs are positioned to keep the leaf springs out of range of the actuator prongs; and a lock-out mechanism configured to pivot the hubs from the disengaged position to the engaged position and secure the hubs in the engaged position, thereby keeping the leaf springs out of range of the actuator prongs, the lock-out mechanism is activated when the actuator is moved to the fully compressed position.

In some embodiments, the device further comprises a guide pin disposed between the base and the actuator. In some embodiments, the set of first actuator prongs comprises a first actuator prong, a second actuator prong, and a third actuator prong and the set of second actuator prongs comprises a first actuator prong, a second actuator prong, and a third actuator prong. In some embodiments, when the actuator is pushed downwardly about 1.25 inches from the starting position the leaf springs each engage the respective first actuator prong, when the actuator is pushed downwardly about 1.5 inches from the starting position the leaf springs each engage the respective second actuator prong, and when the actuator is pushed downwardly about 1.75 inches from the starting position the leaf springs each engage the respective third actuator prong.

In some embodiments, the first hub is pivotally attached to the first pedestal via a first torsion spring, and the second hub is pivotally attached to the second pedestal via a second torsion spring. In some embodiments, the first leaf spring is attached to the first hub via a first spring clamp, and the second leaf spring is attached to the second hub via a second spring clamp.

In some embodiments, the lock-out mechanism comprises a first crank pivotally attached to the first pedestal near the base, the first crank having a first end positioned adjacent to the first hub and a second end extending underneath the actuator, the first crank can pivot between an up position wherein the second end is positioned a distance above the base and a down position wherein the second end is moved downwardly to the base, wherein moving the first crank to the down position causes the first hub to pivot to the engaged position; a second crank pivotally attached to the second pedestal near the base, the second crank having a first end positioned adjacent to the second hub and a second end extending underneath the actuator, the second crank can pivot between an up position wherein the second end is positioned a distance above the base and a down position wherein the second end is moved downwardly to the base, wherein moving the second crank to the down position causes the second hub to pivot to the engaged position; a first pin-hub lock extending toward the first hub, the first pin-hub lock can move between a locked position wherein the first pin-hub lock engages an index hole disposed in the first hub and an unlocked position wherein the first pin-hub lock is free from the index hole; and a second pin-hub lock extending toward the second hub, the second pin-hub lock can move between a locked position wherein the second pin-hub lock engages an index hole disposed in the second hub and an unlocked position wherein the second pin-hub lock is free from the index hole; wherein when the cranks are moved to the down position the cranks pivot the hubs to the engaged position and the pin-hub locks move to the locked position to secure the hubs in the engaged position.

In some embodiments, the device further comprises a reset bar functioning to move the hubs back to the disengaged position from the engaged position. In some embodiments, the device further comprises an actuator decel suspension disposed on a bottom area of the actuator, the actuator decel suspension functions to provide increased resistance when the actuator moves to the fully compressed position.

DESCRIPTION OF PREFERRED EMBODIMENTS

Referring now to FIG. 1-9, the present invention features a heart compression simulation device, which simulates the sensation of separating the costal cartilages in the ribs during chest compressions. The device can help teach proper chest compressions (which can help save lives), and can also help lessen an individual's fear of such an experience. The device (when used in a mannequin) can also provide accurate heart compression resistance. The device can calculate compressions with a compression counter, which can be used for evaluation of an individual's compression rate and depth.

Generally, upon completion of a full stroke of downward motion (e.g., simulation of separating the costal cartilages in the ribs), a lock-out mechanism is engaged. The lock-out mechanism can be reset (e.g., manual reset) as necessary (e.g., after a student has finished his series of compressions). The lock-out mechanism allows subsequent down strokes in the CPR routine to occur without the reoccurrence of the series of shearing sensations being experienced (simulating a real experience wherein once the patient's ribs are broken with an initial compression the rescue worker would not hear re-cracking of the ribs over and over during subsequent compressions). In some embodiments, the maximum downward movement is about 2.25 inches with a simulated shearing of costal cartilage occurring at approximately 1.25 inches, 1.5 inches, and 1.75 inches of downward travel.

Figure 8:
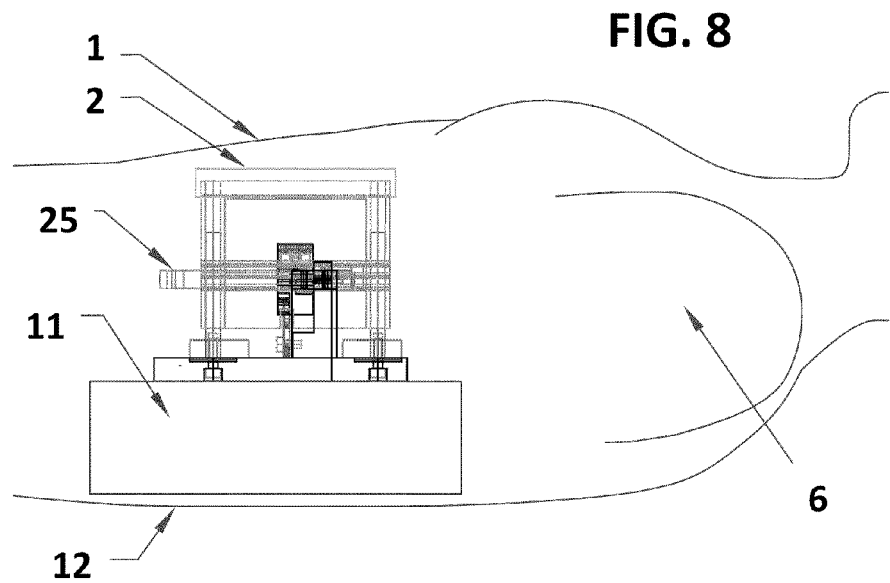
FIG. 8 is an in-use view of the device of the present invention as installed in a mannequin (e.g., torso shell 1). The device is mounted atop a spacer box 11, above the back 12 of the mannequin torso.

The heart compression simulation device of the present invention is often integrated into a mannequin (see FIG. 8). For example, the combination device and mannequin may comprise a simulated human chest/torso membrane, a sternum, and ribs. In some embodiments, the ribs include four internal ribs that can be sheared at the sternum (costal cartilage) when accurate pressure is applied (e.g., appropriate compressions are applied).

The heart compression simulation device achieves the simulated shearing of the costal cartilage by mechanical means. The heart compression simulation device comprises a main base 16. In some embodiments, one or more guide pins 23 (e.g., a first guide pin, a second guide pin) may extend upwardly from the main base 16. Disposed atop the base 16 are one or more actuator compression springs 10 (e.g., coil spring), e.g., a first actuator compression spring and a second actuator compression spring. In some embodiments, the actuator compression springs 10 may be positioned between guide pins 23. In some embodiments, the actuator compression springs 10 may surround the guide pins 23.

Positioned atop the guide pins 23 (and compression springs 10) is an actuator 2. For example, the actuator 2 and base 16 sandwich the compression springs 10. The actuator 2 can move between an extended position (e.g., positioned a certain distance above the main base 16, e.g., a starting position) and a fully compressed position (e.g., wherein the actuator 2 is moved toward the main base 16). The actuator 2 is biased in the extended position caused by the compression springs 10. A user can place his hand above the top surface of the actuator 2 and press downwardly to move the actuator 2 to the fully compressed position (or the top surface of the actuator 2 is pressed through other material, for example if the device is in a mannequin).

Disposed atop the main base 16 are a first pedestal 17A and a second pedestal 17B, the pedestals 17 being positioned opposite each other and outside of where the actuator 2 is positioned. For example, the first pedestal 17A is positioned at a first edge of the base 16 and the second pedestal 17B is positioned at a second edge of the base 16, the second edge being opposite the first.

Figure 1:
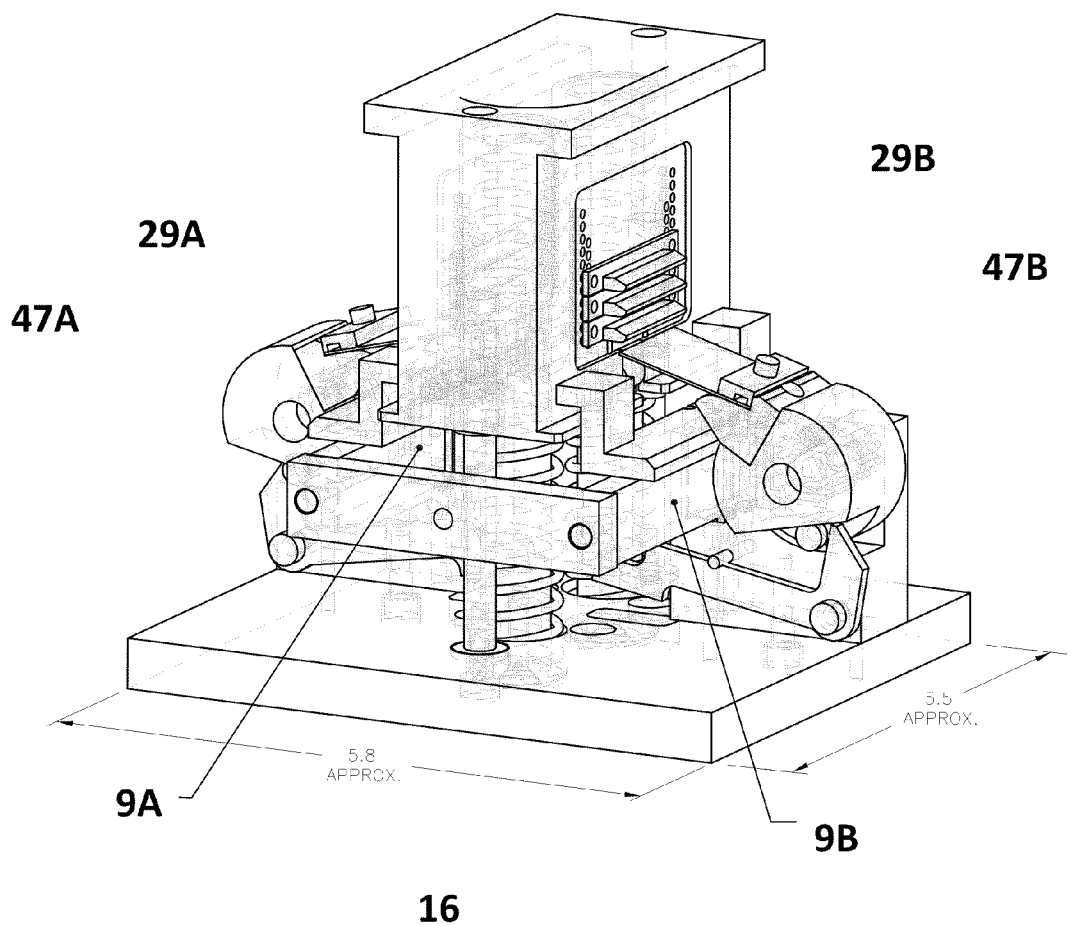
FIG. 1 is an isometric view of the device of the present invention. The device is in a starting position. Dimensions shown are in inches. The present invention is not limited to the dimensions shown in FIG. 1.

In some embodiments, a first cover bar 29A is disposed atop the first pedestal 17A and a second cover bar 29B is disposed atop the second pedestal 17B. As shown in FIG. 1, the first cover bar 29A is disposed atop a first index bar 9A, and the second cover bar 29B is disposed atop a second index bar 9B, the index bars 9 being disposed atop the respective pedestals 17. The cover bars 29 are configured to allow the actuator 2 to move between the extended position and the compressed position. In some embodiments, wing tabs are disposed on the bottom portion of the actuator 2, and the cover bars may help prevent the actuator 2 from moving too far upwardly (when it moves back to the extended position) by engaging the wing tabs.

A plurality of actuator prongs 22 is disposed on the actuator 2. For example, a set of first actuator prongs 22A is disposed on the actuator 2 facing the first pedestal 17, and a set of second actuator prongs 22B is disposed on the actuator 2 facing the second pedestal 17. In some embodiments, the sets of actuator prongs 22 comprise three actuator prongs. The cover bars 29 do not interfere with or engage the actuator prongs 22 when the actuator moves between the extended position and the compressed position (e.g., the cover bars 29 are spaced outside of the actuator prongs 22, for example as shown in FIG. 1).

A first hub 47A is pivotally attached to the first pedestal 17A (e.g., via a first torsion spring 19A). A first leaf spring 21A is disposed on the first hub 47A (e.g., attached via a first spring clamp 18A). A second hub 47B is pivotally attached to the second pedestal 17B (e.g., via a second torsion spring 19B). A second leaf spring 21B is disposed on the second hub 47B (e.g., attached via a second spring clamp 18B).

The leaf springs 21 are configured to engage the actuator prongs 22 disposed on the actuator 2. When the actuator 2 is in the extended position, the leaf springs 21 are situated underneath the lowest of the actuator prongs 22. The leaf springs 21 provide resistance when the actuator 2 is pressed downwardly to the compressed position. This resistance caused by the leaf springs 21 may be similar to resistance experienced when performing compressions on a human (e.g., during a real emergency situation).

When the actuator 2 is pressed, pressure is applied to the leaf springs 21 via the actuator prongs 22. When adequate pressure is applied, the leaf springs 21 are "snapped," or forced upwardly to an adjacent actuator prong (e.g., above the previous actuator prong). The movement of the leaf springs 21 past the respective actuator prongs 22 (the "snapping" of the leaf springs 21) causes a sound. This sound is designed to simulate the tearing of costal cartilages, for example as it might sound when one is performing compressions in a real emergency situation.

In some embodiments, the device is configured such that the snapping of the leaf springs 21 first occurs when the actuator 2 is pushed downwardly about 1.25 inches. In some embodiments, the device is configured such that snapping of the leaf springs 21 occurs a second time when the actuator 2 is pushed downwardly about 1.5 inches. In some embodiments, the device is configured such that snapping of the leaf springs 21 occurs a third time when the actuator 2 is pushed downwardly about 1.75 inches.

The present invention is not limited to the aforementioned configurations and components (e.g., actuator prongs, leaf springs, compression springs, etc.). For example, other designs may be considered that achieve the features of the present invention such has simulation of resistance and sounds (e.g., rib cracking). Other examples of designs include but are not limited to latch mechanisms that release upon appropriate downward force (e.g., latch types may be gas-filled, spring-loaded, over-center, mechanical, and/or the like); pneumatic mechanisms wherein compressed air creates resistance to downward movement (e.g., systems comprised of bellows or collapsing chambers, pressure relief valves, check valves, accumulators, and/or the like; the like, or a combination thereof.

Lock-Out Mechanism

The device of the present invention comprises a lock-out mechanism for moving the leaf springs 21 out of range of the actuator prongs 22. The lock-out mechanism is engaged upon completion of a full stroke of downward motion (e.g., simulation of separating the costal cartilages in the ribs). In some embodiments, the lock-out mechanism can be reset (e.g., manual reset) via a reset button (or reset bar 25) as necessary (e.g., after a student has finished his series of compressions). The present invention is not limited to the components and configurations of the lock-out mechanism described herein. For ex ample other mechanisms that achieve the same end result may also be used.

Figure 3:
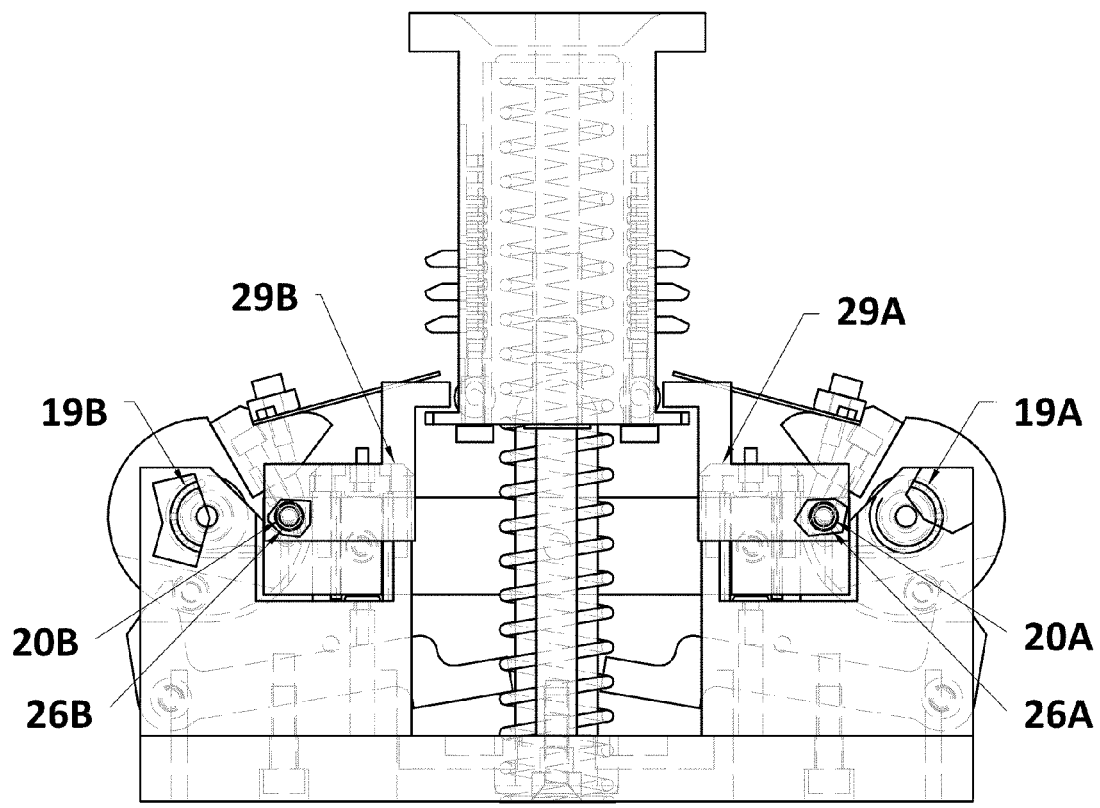
FIG. 3 is a back view of the device of the present invention. The device is in a starting position.
Figure 4A:
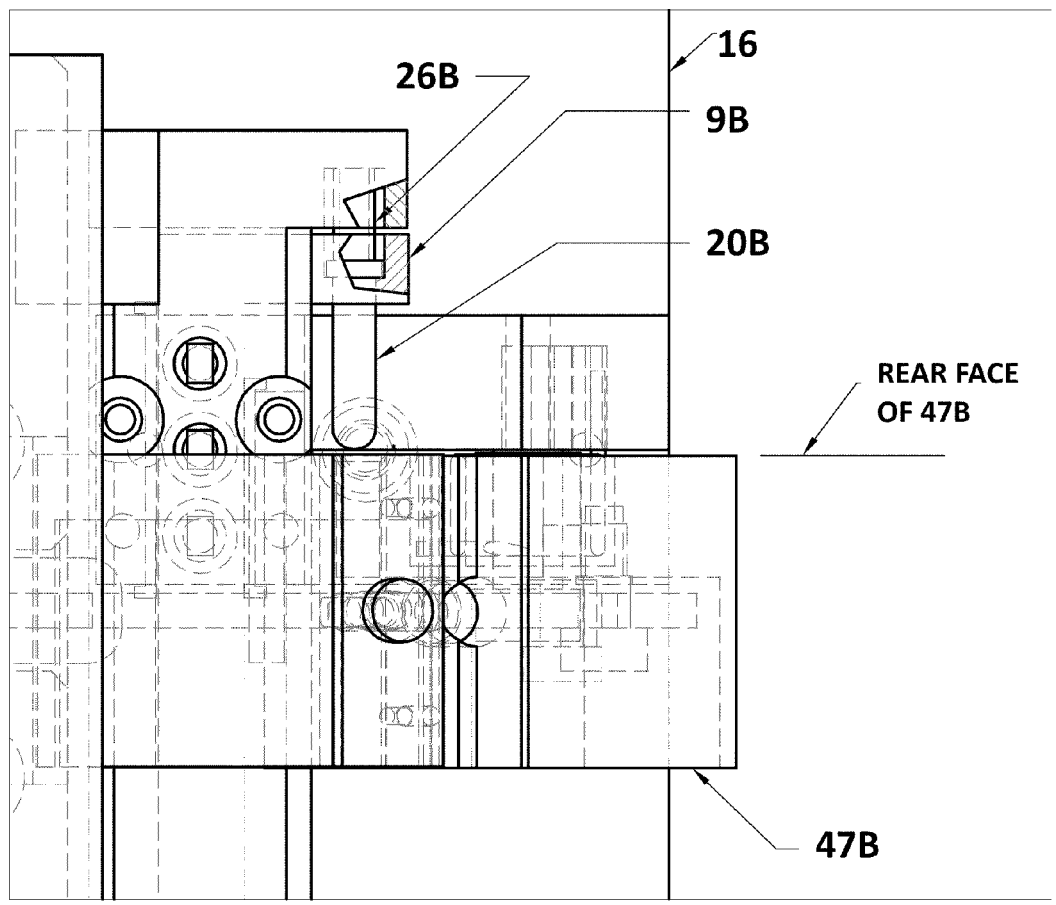
FIG. 4A is a first top view of the hub (upper portion) of the device of the present invention.
Figure 4B:
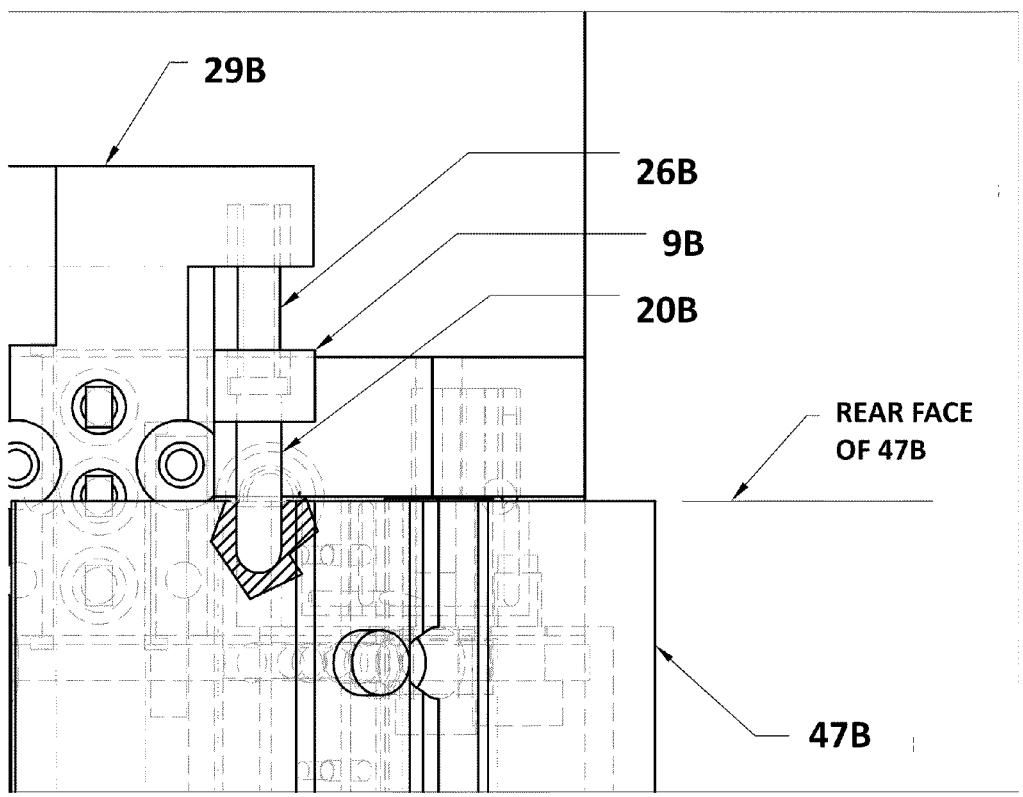
FIG. 4B is a second top view of the hub (upper portion) of the device of the present invention.

Referring now to FIG. 3, and FIG. 4A, in some embodiments, a first pin-hub lock 20A extends from a portion of the first cover bar 29A, the first pedestal 17A, and/or the first index bar 9A toward the first hub 47A. A second pin-hub lock 20B extends from a portion of the second cover bar 29B, the second pedestal 17B, and/or the second index bar 9B toward the second hub 47B. The first pin-hub lock 20A comprises a first hub lock spring 26A, and the second pin-hub lock 20B comprises a second hub lock spring 26B. The pin-hub locks 20 are adapted to move between an unlocked position (not engaging the respective hubs 47) and a locked position, wherein the locks 20 engage the hubs 47 (e.g., index holes 48 disposed in the hubs 47), thereby locking the movement of the hubs 47. FIG. 4A shows an example of the unlocked position and FIG. 4B shows an example of the locked position.

Figure 2:
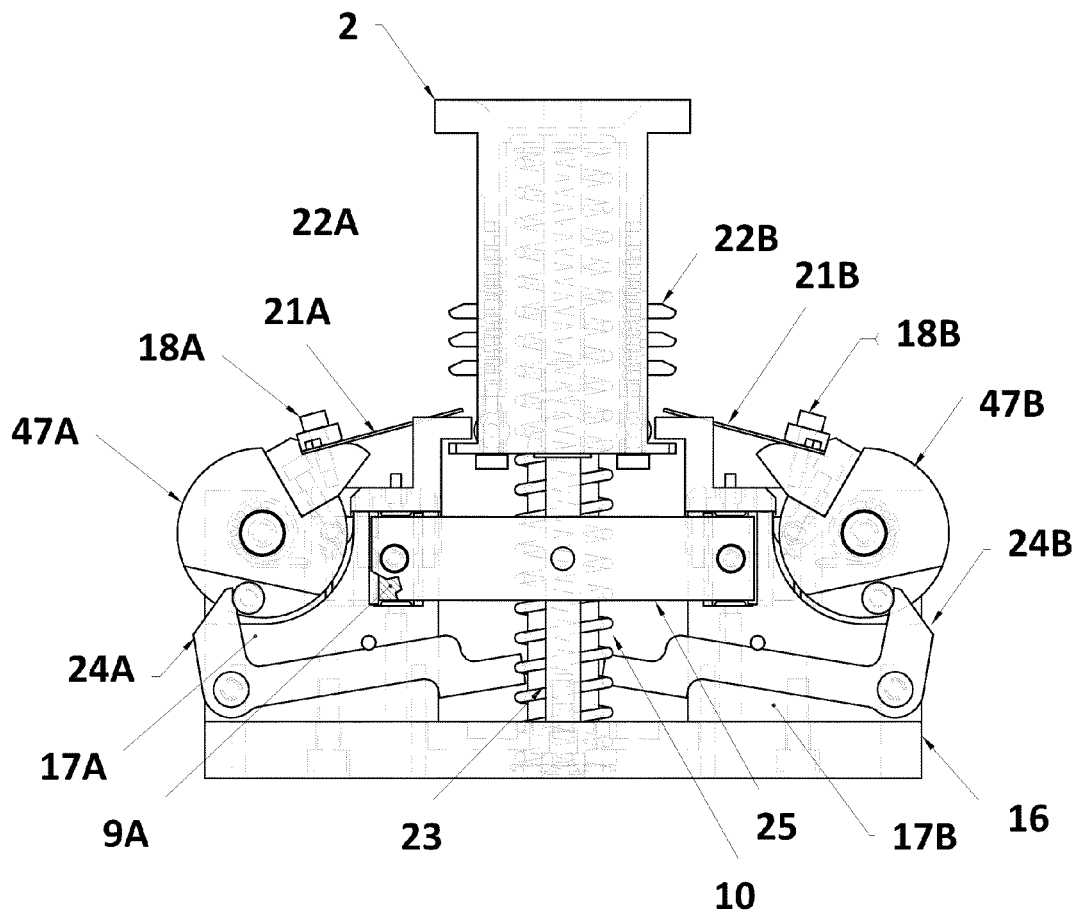
FIG. 2 is a front view of the heart compression simulation device of the present invention. The device is in a starting position.
Figure 2A:
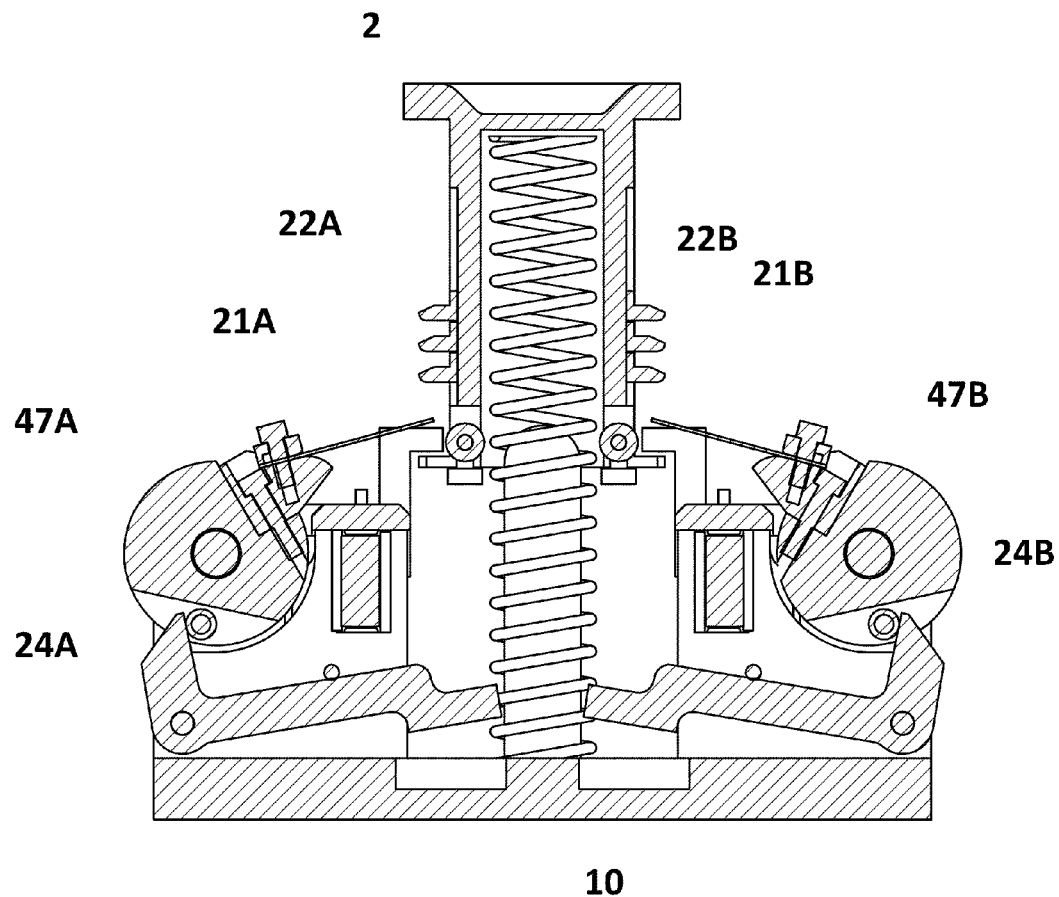
FIG. 2A is a cross sectional view of the heart compression simulation device of FIG. 2.
Figure 2B:
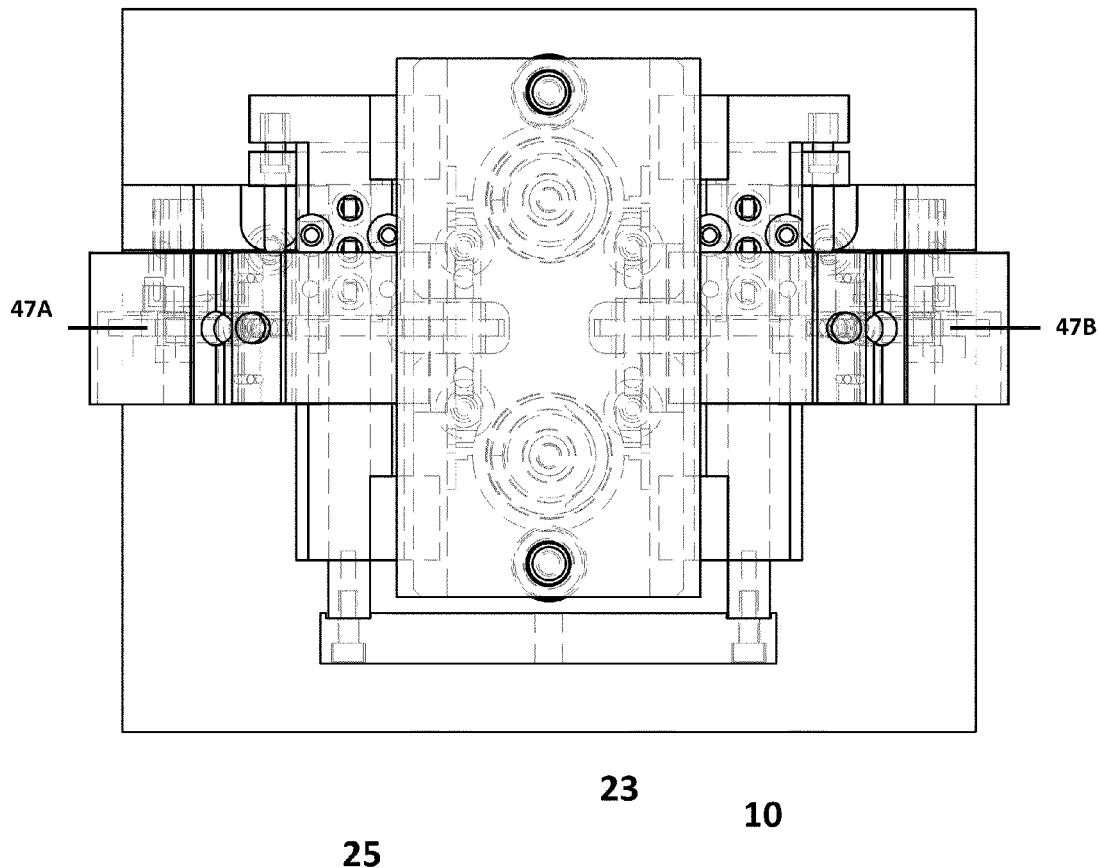
FIG. 2B is a top view and internal view of the heart compression simulation device of the present invention.
Figure 5A:
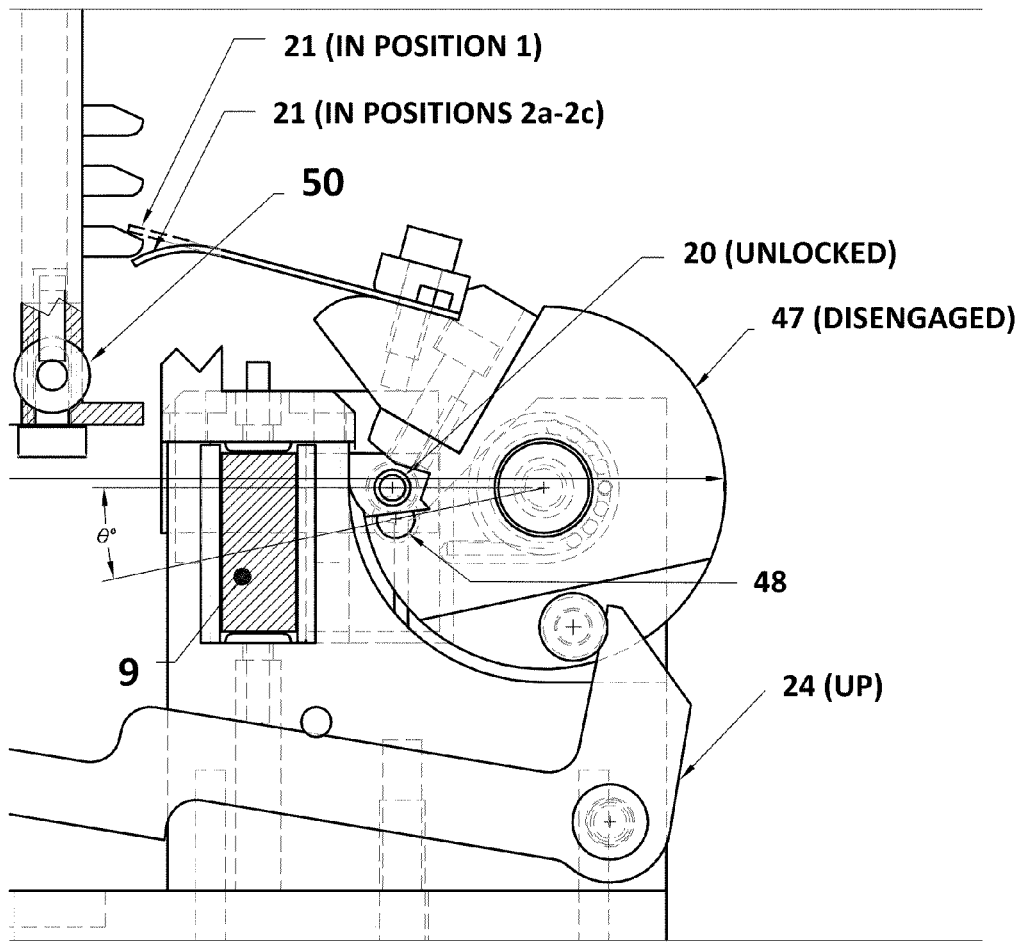
FIG. 5A is a first exploded side view of the device of the present invention.
Figure 5B:
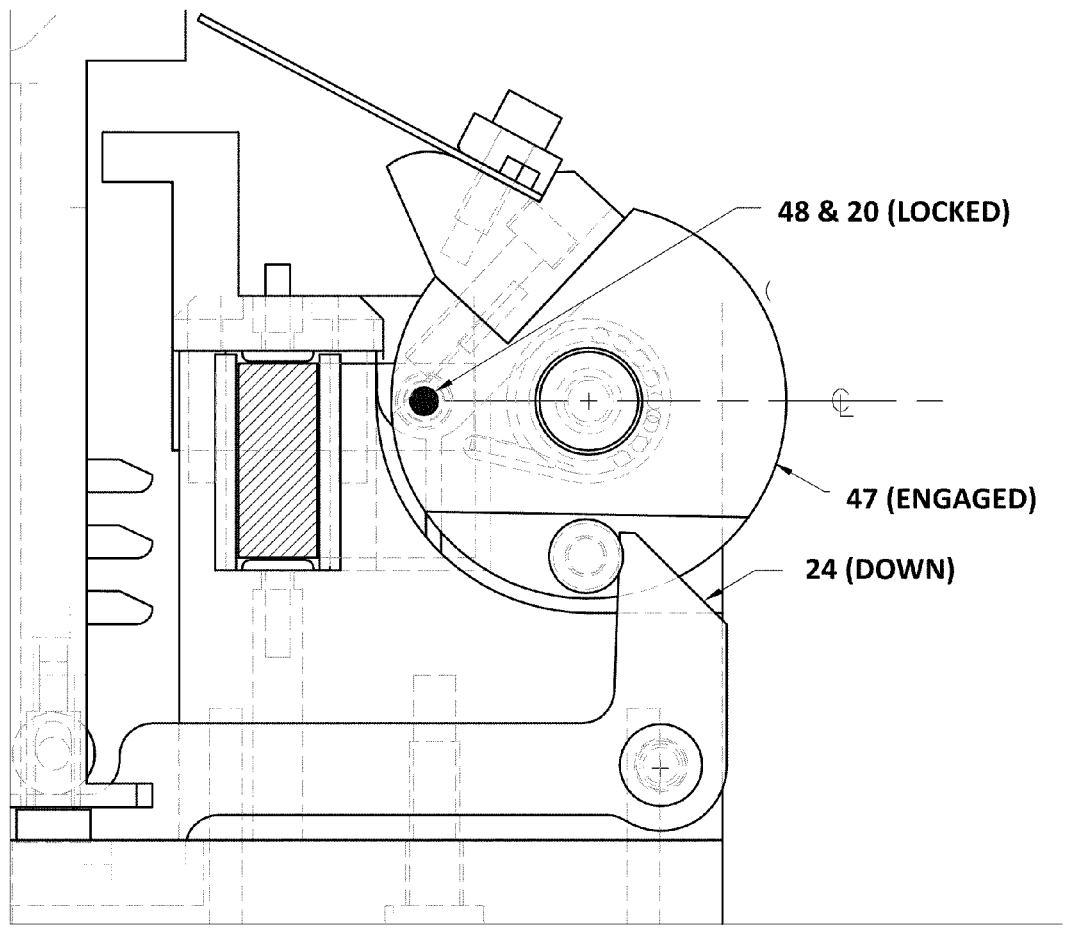
FIG. 5B is a second exploded side view of the device of the present invention.

A first crank 24A may be pivotally attached to the first pedestal 17A near the base 16. The first crank 24A has a first end and a second end. The first end of the first crank 24A may engage the first hub 47A (or can be pivoted to engage the first hub 47A), e.g., a first notch in the first hub 47A, and the second end of the first crank 24A extends from the first pedestal 17A to underneath the actuator 2. A second crank 24B may be pivotally attached to the second pedestal 17B near the base 16. The second crank 24B has a first end and a second end. The first end of the second crank 24B may engage the second hub 47B (or can be pivoted to engage the second hub 47B), e.g., a second notch in the second hub 47B, and the second end of the second crank 24B extends from the second pedestal 17B to underneath the actuator 2. The cranks 24 can pivot between an up position wherein the second ends of the cranks 24 are moved upwardly toward the actuator 2 (e.g., not contacting the base 16) and a down position wherein the second ends of the cranks 24 are moved downwardly toward the base 16 (e.g., contacting the base 16). FIG. 1, FIG. 2, and FIG. 5A show the cranks 24 in the up position. FIG. 5B shows the crank in the down position. The cranks 24 are biased in the up position, for example the cranks 24 are moved to the up position before a student begins a series of compressions (e.g., because the cranks 24 in the up position corresponds to the leaf springs 21 being capable of engaging the actuator prongs 22).

Figure 6A:
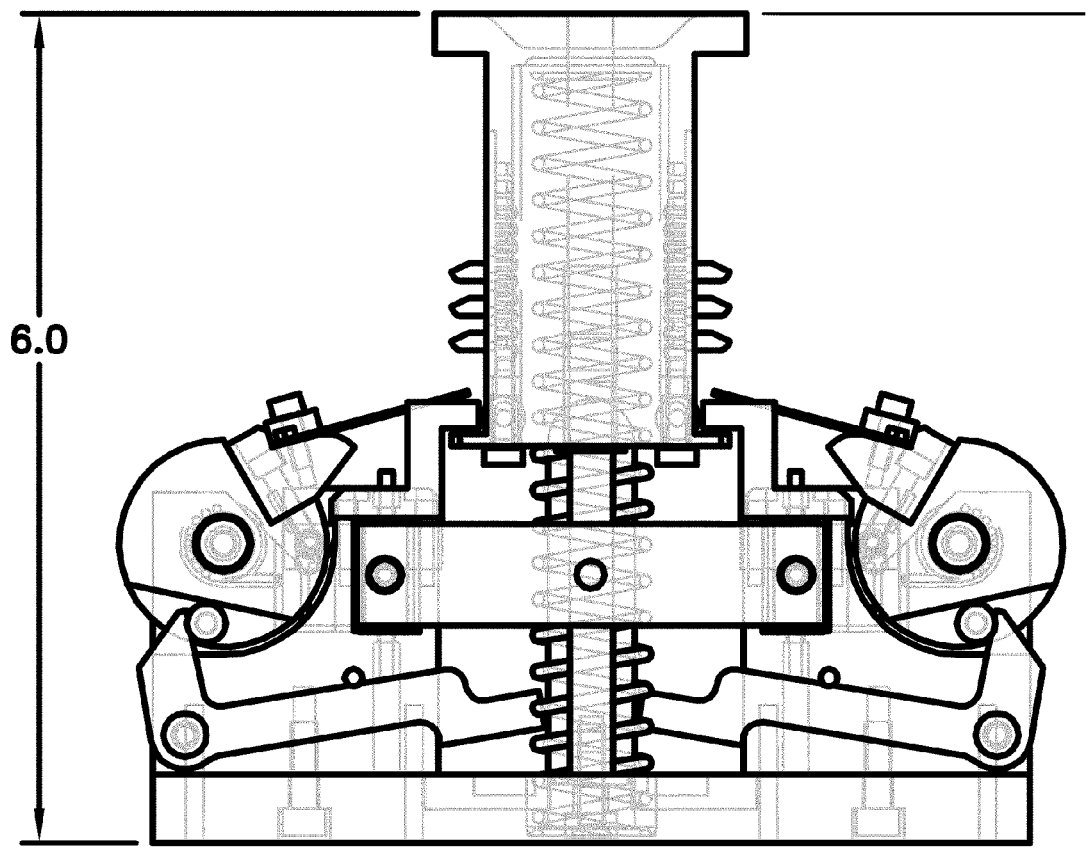
FIG. 6A-6E is a step-by-step representation of the movement of the device of the present invention.
Figure 6B:
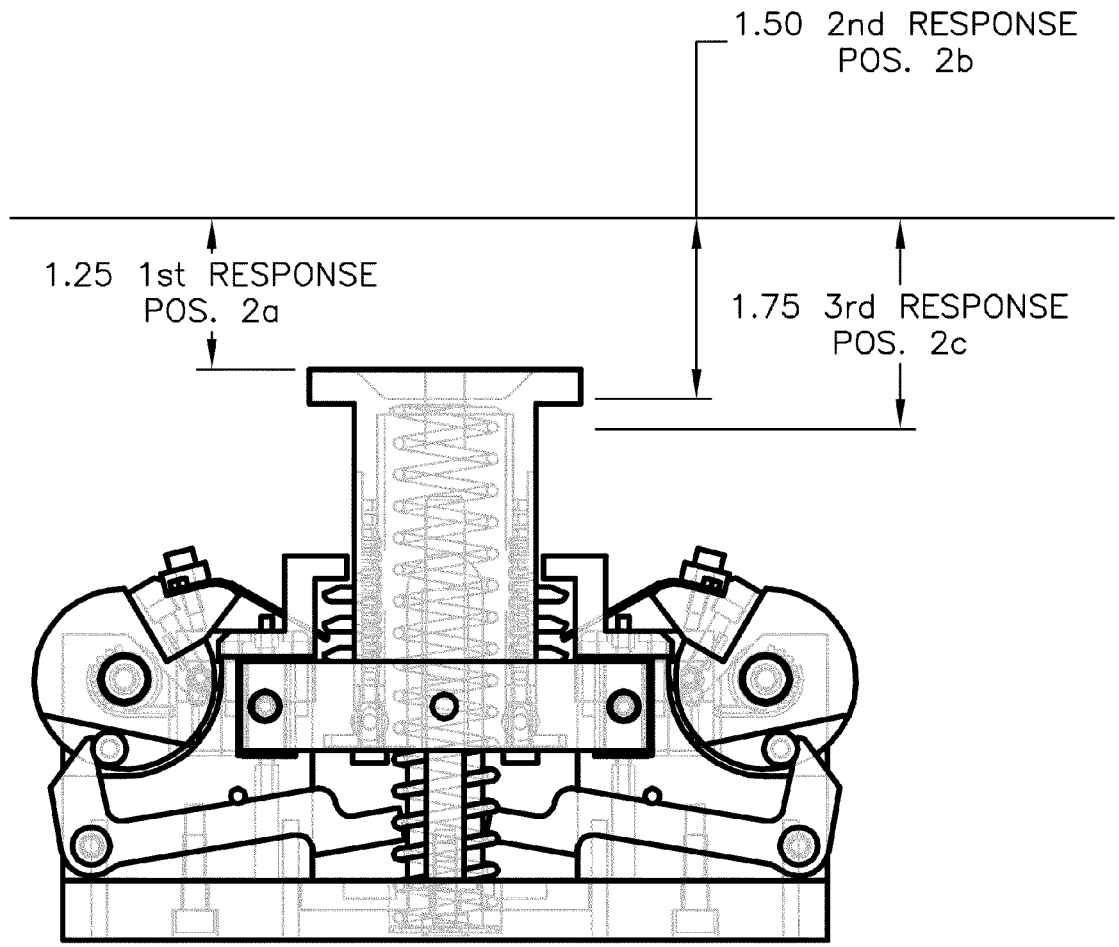

Referring now to FIG. 5A and FIG. 6A, prior to a first downward stroke the actuator 2 is in the extended position, the cranks 24 are in the up position (e.g., FIG. 5A), and the hubs 47 are in a disengaged position. The pin-hub locks 20 are in the unlocked position. The leaf springs 21 are positioned below the actuator prongs 22. Referring now to FIG. 5B and FIG. 6D, when the actuator is moved down to the compressed position, the actuator 2 moves the cranks 24 to the down position, which moves the hubs 47 to the engaged position (e.g., the cranks 24 rotate the respective hubs 47), allowing the pin-hub locks 20 to be moved to the locked position (e.g., into the index holes 48 in the hubs 47), thus securing the hubs 47 in the engaged position. With the hubs 47 in the engaged position, the leaf springs 21 are moved such that they cannot engage the actuator prongs 22 (and cause the "cracking sound" for subsequent compressions). The actuator 2 can be used for subsequent compressions with the hubs 47 engaged with the pin-hub locks 20.

The leaf springs 21 are held out of use until they are reset with the reset bar 25. For example, pressing the reset bar 25 may move the pin-hub locks 20 to the unlocked position, allowing the hubs 47 to move to the disengaged position, and the cranks 24 to move to the up position.

Referring again to FIG. 5A, an actuator decel suspension 50 (e.g., a spring axle and/or roller) is disposed on the bottom of the actuator 2. When the actuator is moved to the compressed position, the actuator decel suspension 50 presses down on the cranks 24 and/or base 16. The actuator decel suspension 50 can provide some resistance when contacting the cranks 24 and/or base 16.

FIG. 6A shows the device of the present invention at a starting position (Position 1), wherein the device is at rest prior to a first downward compression. The actuator 2 has been pressed 0 inches from its starting position. FIG. 6B shows the device in Position 2a, wherein the "shearing" starts. With three actuator prongs 22, there are three consecutive snap responses (e.g., Positions 2a, 2b, and 2c), wherein the leaf springs 21 snap over the actuator prongs 22. In some embodiments, Position 2a refers to the actuator 2 being pressed about 1.25 inches from its starting position, Position 2b refers to the actuator 2 being pressed about 1.5 inches from its starting position, and Position 2c refers to the actuator 2 being pressed about 1.75 inches from its starting position. In Positions 2a-2c, the actuator 2 has not been fully moved to the compressed position.

Figure 6C:
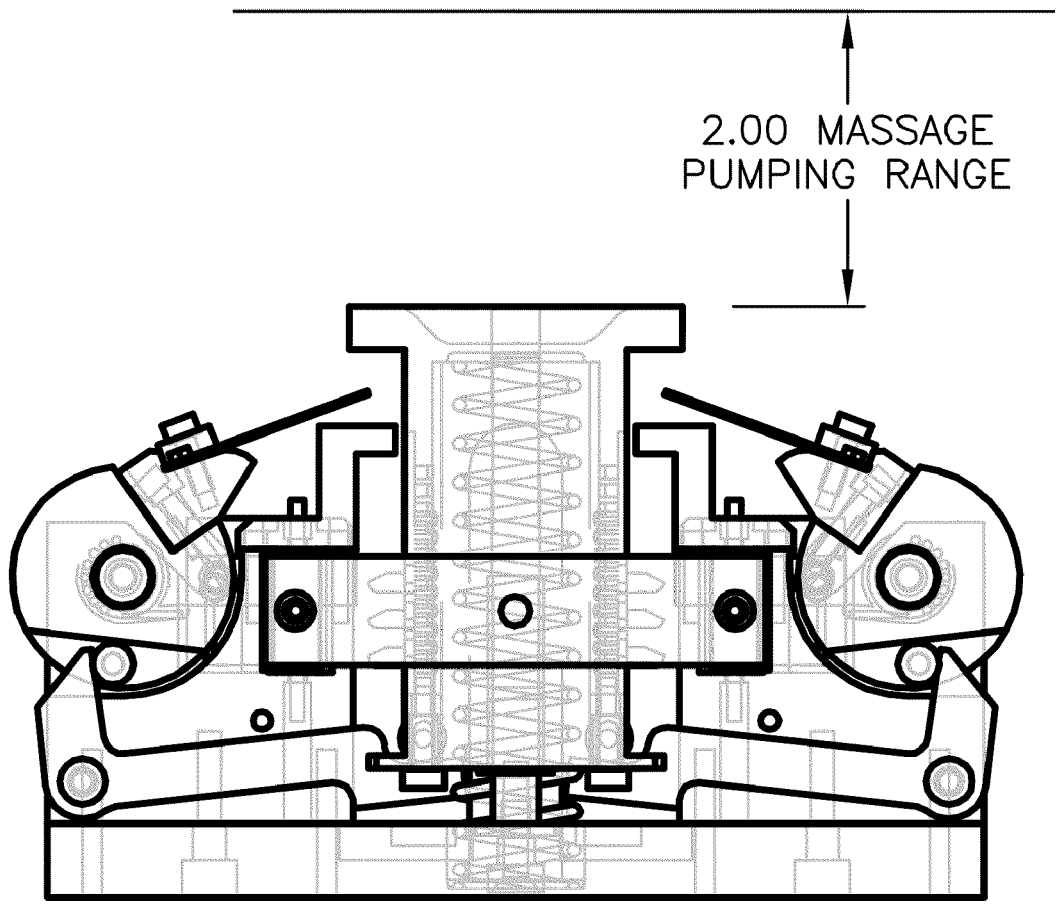
Figure 6D:
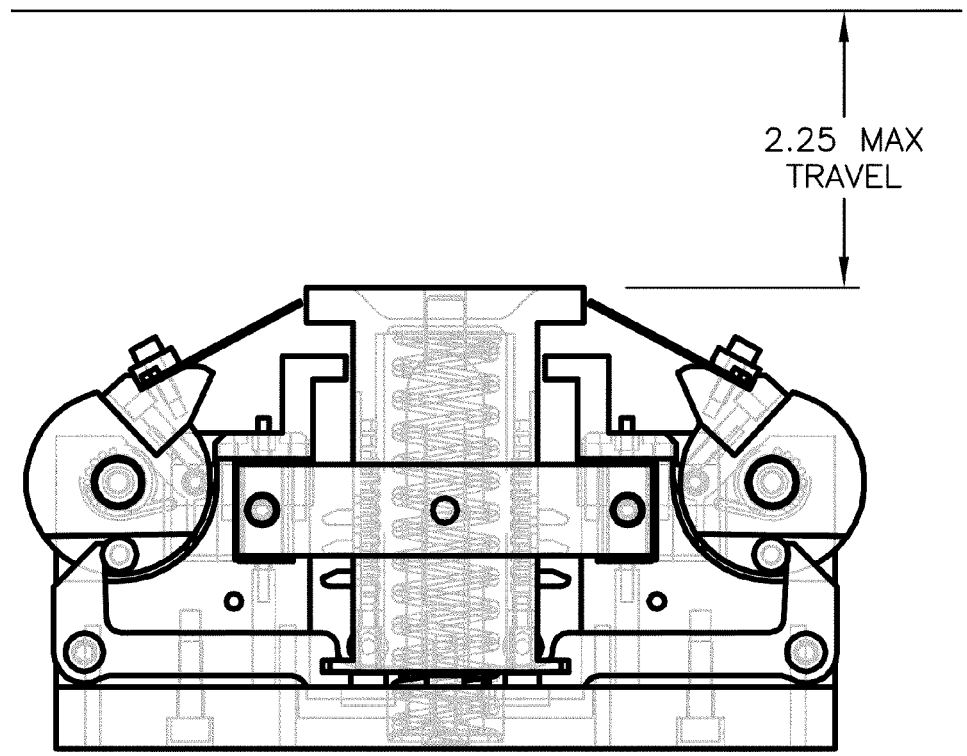

FIG. 6C shows the device is Position 3, wherein the leaf springs 21 have passed each actuator prong 22 and the actuator 2 is pushed toward the compressed position. In some embodiments, Position 3 refers to the actuator 2 being pressed about 2 inches from its starting position. In Position 3, the actuator 2 (e.g., actuator decel suspension 50) begins to contact the cranks 24.

Figure 6E:
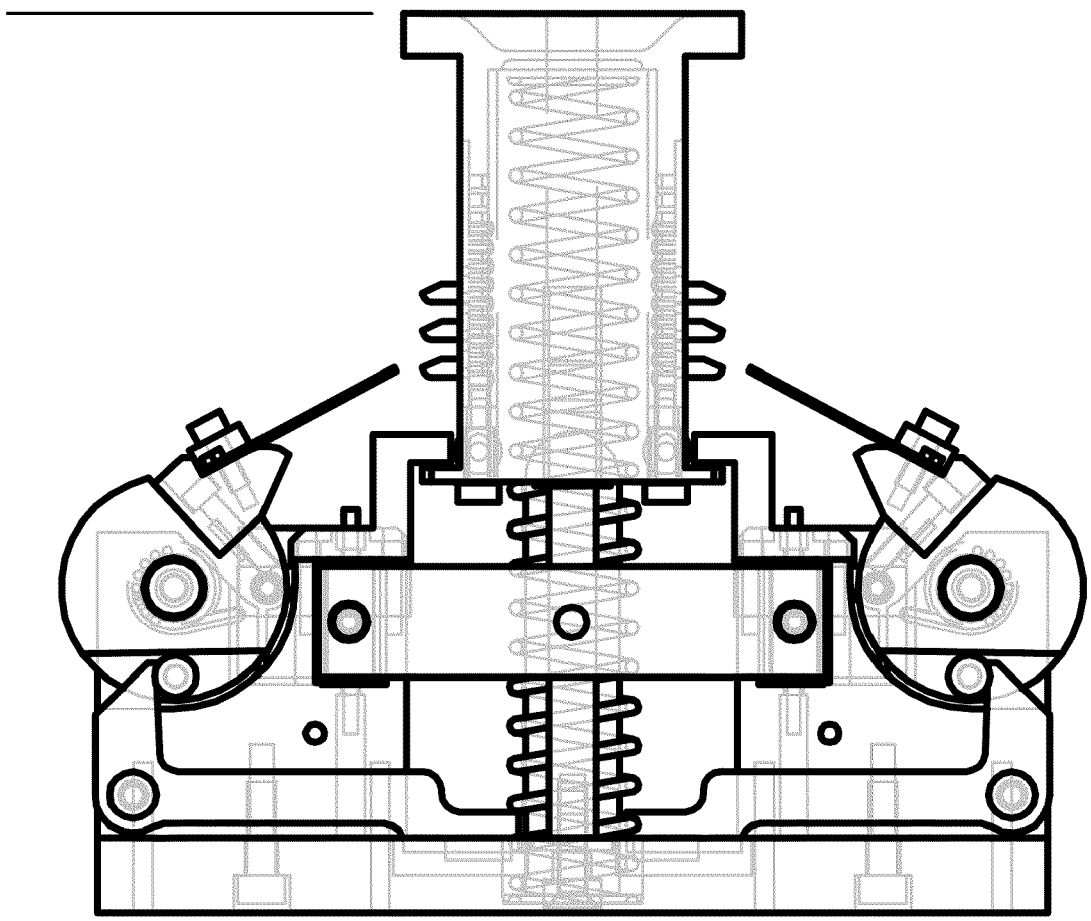
Figure 7:
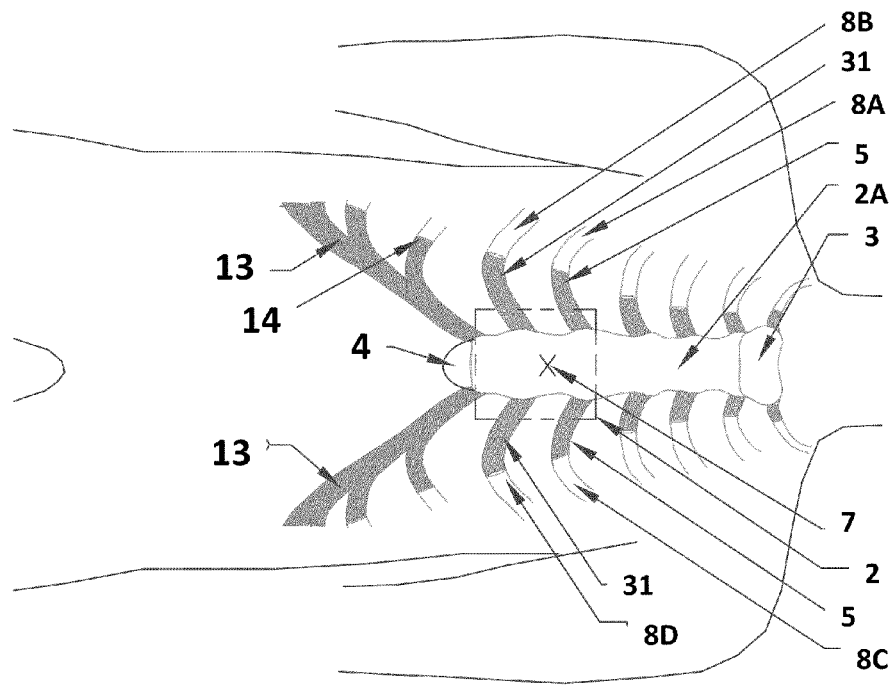
FIG. 7 is a top view of a mannequin torso shell 1. Simulated mannequin components such as sternum body 2A, manubrium 3, xiphoid process 4, costal cartilage 5, 13, 31, palm placement 7 for heart compressions, right side #5 rib 8A, right side #6 rib 8B, left side #5 rib 8C, left side #6 rib 8D, arm/shoulder 6, simulated costal cartilage for ribs 5, 13, 31 (e.g., ribs #7, #8, #9, & #10), and costochondrial junctions 14 (between rib bone and costal cartilage).

FIG. 6D shows the device in Position 4, wherein the actuator 2 is in the compressed position, which engages the lock-out mechanism by moving the cranks 24 to the down position (the pin-hub locks 20 become locked in the hubs 47), ultimately moving the leaf springs 21 away from the actuator prongs 22. FIG. 6E shows the device in Position 5, wherein the actuator 2 resumes the extended position (e.g., caused by the compression springs 10 when no downward force is applied to the actuator 2). The lock-out mechanism is set for subsequent compressions of the actuator 2.

Sensors and Compression Counters

In some embodiments, one or more sensors are disposed on the device configured to determine the depth of the compressions. The sensors can help determine if compressions are appropriate (e.g., not too deep, not too shallow). The sensors may be operatively connected to the springs or to other components of the device. The sensors are operatively connected to a microprocessor housed in the device. In some embodiments, the microprocessor comprises memory storage components for storing pre-recorded messages, for example "too deep." In some embodiments, the microprocessor is operatively connected to a speaker component for emitting the pre-recorded messages when necessary.

In some embodiments, when the sensor detects the compression is too deep (e.g., about 2.25 inches), the sensor sends a first input signal to the microprocessor. Upon receipt of the first input signal, the microprocessor sends a first output command to the speaker to cause the speaker to emit a first pre-recorded sound, for example "too deep."

The device further comprises a clicker counter designed to count the number of times the actuator 2 is pressed down toward the compressed position. The clicker counter may be operatively connected to the microprocessor. In some embodiments, the clicker counter may be used to calculate the rate at which the actuator 2 is pressed to the compressed position. For example, the microprocessor may be operatively connected to a timer, whereby the microprocessor can calculate the number of compressions counted by the clicker counter in a certain period of time. In some embodiments, the timer can be set for a certain length of time (e.g., 1 minute). The timer may allow an individual (e.g., a student) to evaluate his/her compressions per minute, for example. The microprocessor may be operatively connected to a display for displaying the number of compressions and/or compression rate.

In some embodiments, the clicker counter is configured to count only the compressions that are deep enough to be effective, for example about 1 inch deep, about 1.5 inches deep, about 2 inches deep, etc. Information obtained by the sensor (that senses depth of the compressions) may be combined with the clicker counter to calculate the number of effective compressions.

In some embodiments, an appropriate number of compressions per minute is between about 75 to 100 compressions for adults.

Forces

In some embodiments, the device of the present invention builds with pounds of force as it is pressed (e.g., compression springs 10 first, then leaf springs 21) to a desired downward force (e.g., about 65 to 72 pounds, for example 68 pounds of downward force, for adults). The downward force is not limited to the aforementioned ranges. For example, in some embodiments, the downward force may be less to a degree that is appropriate for children. Then the actuator 2 is released (e.g., just after the leaf springs 21 pass the actuator prongs 22). Then the device reloads the compression springs in the downward motion until it reaches the compressed position. This may replicate the human chest cavity. The chest cavity will increase resistance even after the costal cartilages are torn with further compression of the chest.

The actuator 2 has an upward force imparted on it via compression springs 10 (and/or other compressible material). The force is generally augmented (in the applicable portion of motion) via leaf springs 21. The leaf springs 21 cause an increase in resistance to downward travel, which will then be released (e.g., periodically) by the mechanisms of the device of the present invention to simulate the occurrences of the shearing action (e.g., via three actuator prongs 22).

Figure 9A:
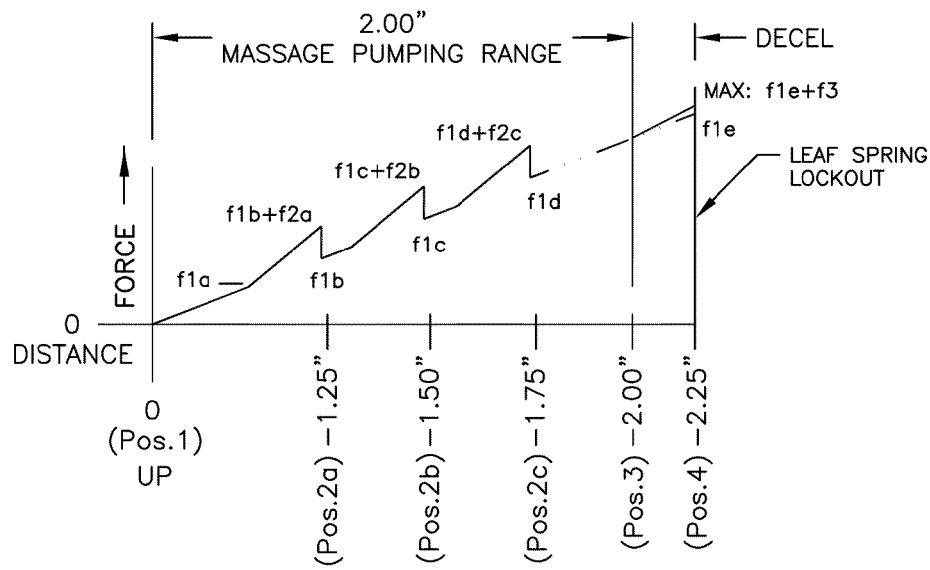
FIG. 9A is a force diagram showing force over distance during an initial down stroke.
Figure 9B:
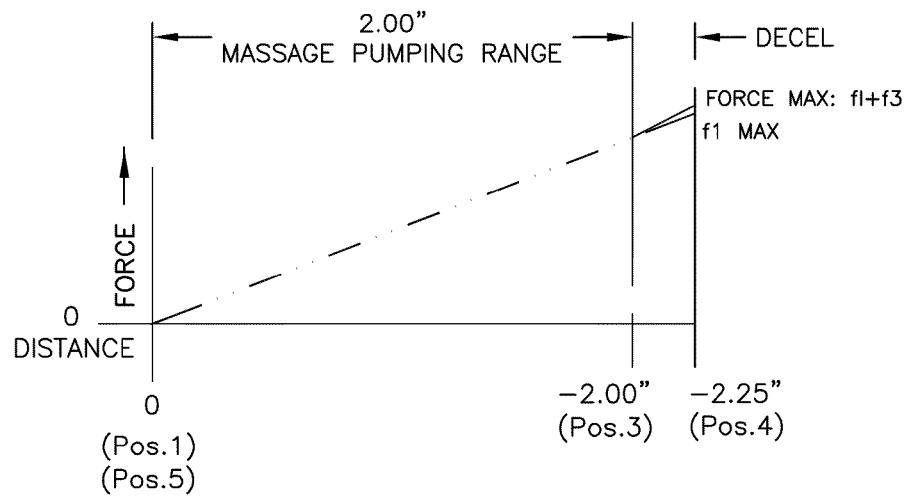
FIG. 9B is a force diagram showing force over distance during subsequent down strokes (after the lock-out mechanism engages).
Figure 9C:
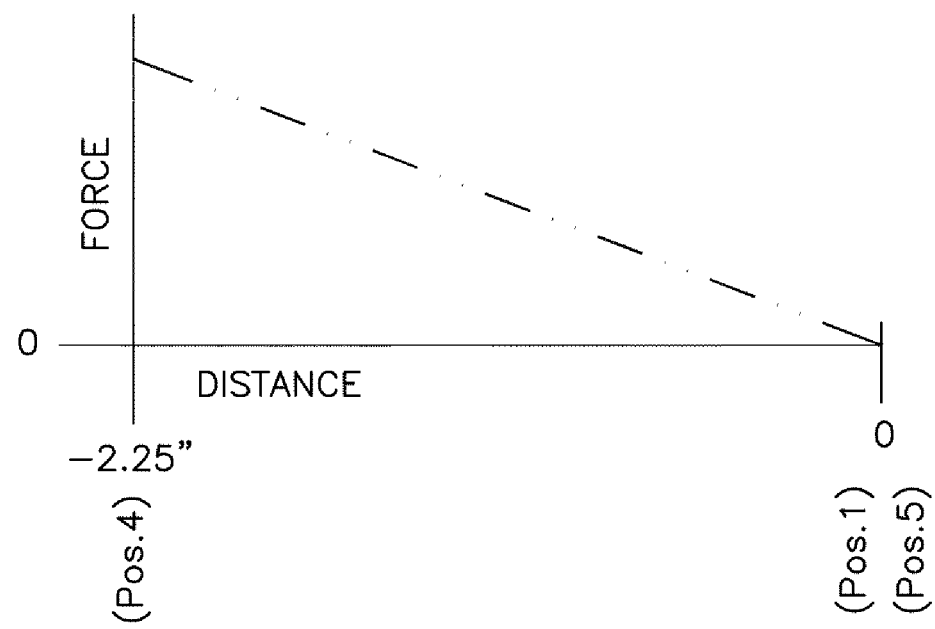
FIG. 9C is a force diagram showing force over distance during up strokes.

Referring now to the force symbols in the FIG. 9A-9C, f1a-f1e refers to the main compression springs at various points of travel, for example length compressed by spring rate (e.g., lbs/inch) at positions 2-4; f2a-f2c refers to the force to deflect leaf spring at each shearing position (e.g., positions 2a-2c); and f3 refers to the force of the actuator/crank roller's "decel spring suspension." The force notations may ignore preload values imparted to the compression spring, which may be needed but may be minor.

Dimensions

The device of the present invention may be constructed in a variety of sizes. For example, in some embodiments, the base 16 is between about 4 to 8 inches (e.g., 5.8 inches) in length as measured from a first side to a second side. In some embodiments, the base 16 is more than about 8 inches in length. In some embodiments, the base 16 is between about 3 to 7 inches (e.g., 5.5 inches) in width as measured from a third side to a fourth side. In some embodiments, the base 16 is more than about 7 inches in width.

As used herein, the term "about" refers to plus or minus 10% of the referenced number. For example, an embodiment wherein the base 16 is about 5.5 inches in width includes a base 16 that is between 4.95 and 6.05 inches in width.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A heart compression simulation device comprising:
   (a) a base;
   (b) a compression spring extending upwardly from the base;
   (c) an actuator disposed atop the compression spring, the actuator and base together sandwich the compression spring; wherein the actuator can move between an extended position wherein the actuator is positioned at a starting position above the base, and a fully compressed position wherein the actuator is pushed down to the base, the actuator is biased in the extended position caused by the compression spring;
   (d) a first pedestal and a second pedestal each disposed atop the base, the pedestals are positioned opposite each other and outside of the actuator;
   (e) a set of first actuator prongs disposed on the actuator facing the first pedestal and a set of second actuator prongs disposed on the actuator facing the second pedestal;
   (f) a first hub pivotally attached to the first pedestal and a second hub pivotally attached to the second pedestal;
   (g) a first leaf spring disposed on the first hub and positioned below the set of first actuator prongs, and a second leaf spring disposed on a second hub and positioned below the set of second actuator prongs, the leaf springs are adapted to engage the respective sets of actuator prongs when the actuator is moved to the fully compressed position, the leaf springs provide resistance when the actuator is moved to the fully compressed position, wherein when the actuator is moved to the fully compressed position and the leaf springs engage the respective sets of actuator prongs a cracking sound is produced;
   wherein the hubs can each pivot between a disengaged position wherein the hubs are positioned to allow the leaf springs to engage the respective sets of actuator prongs and an engaged position wherein the hubs are positioned to keep the leaf springs out of range of the actuator prongs; and
   (h) a lock-out mechanism configured to pivot the hubs from the disengaged position to the engaged position and secure the hubs in the engaged position, thereby keeping the leaf springs out of range of the actuator prongs, the lock-out mechanism is activated when the actuator is moved to the fully compressed position.

2. The device of claim 1 further comprising a guide pin disposed between the base and the actuator.

3. The device of claim 1, wherein the set of first actuator prongs comprises a first actuator prong, a second actuator prong, and a third actuator prong and the set of second actuator prongs comprises a first actuator prong, a second actuator prong, and a third actuator prong.

4. The device of claim 3, wherein when the actuator is pushed downwardly about 1.25 inches from the starting position the leaf springs each engage the respective first actuator prong, when the actuator is pushed downwardly about 1.5 inches from the starting position the leaf springs each engage the respective second actuator prong, and when the actuator is pushed downwardly about 1.75 inches from the starting position the leaf springs each engage the respective third actuator prong.

5. The device of claim 1, wherein the first hub is pivotally attached to the first pedestal via a first torsion spring, and the second hub is pivotally attached to the second pedestal via a second torsion spring.

6. The device of claim 1, wherein the first leaf spring is attached to the first hub via a first spring clamp, and the second leaf spring is attached to the second hub via a second spring clamp.

7. The device of claim 1, wherein the lock-out mechanism comprises:
   (a) a first crank pivotally attached to the first pedestal near the base, the first crank having a first end positioned adjacent to the first hub and a second end extending underneath the actuator, the first crank can pivot between an up position wherein the second end is positioned a distance above the base and a down position wherein the second end is moved downwardly to the base, wherein moving the first crank to the down position causes the first hub to pivot to the engaged position;
   (b) a second crank pivotally attached to the second pedestal near the base, the second crank having a first end positioned adjacent to the second hub and a second end extending underneath the actuator, the second crank can pivot between an up position wherein the second end is positioned a distance above the base and a down position wherein the second end is moved downwardly to the base, wherein moving the second crank to the down position causes the second hub to pivot to the engaged position;
   (c) a first pin-hub lock extending toward the first hub, the first pin-hub lock can move between a locked position wherein the first pin-hub lock engages an index hole disposed in the first hub and an unlocked position wherein the first pin-hub lock is free from the index hole; and
   (d) a second pin-hub lock extending toward the second hub, the second pin-hub lock can move between a locked position wherein the second pin-hub lock engages an index hole disposed in the second hub and an unlocked position wherein the second pin-hub lock is free from the index hole;
   wherein when the cranks are moved to the down position the cranks pivot the hubs to the engaged position and the pin-hub locks move to the locked position to secure the hubs in the engaged position.

8. The device of claim 1 further comprising a reset bar functioning to move the hubs back to the disengaged position from the engaged position.

9. The device of claim 1 further comprising an actuator decel suspension disposed on a bottom area of the actuator, the actuator decel suspension functions to provide increased resistance when the actuator moves to the fully compressed position.

* * * * *